United States Patent
Ebara et al.

(12) 
(10) Patent No.: US 6,822,049 B2
(45) Date of Patent: Nov. 23, 2004

(54) PROPYLENE-BASED RESIN COMPOSITION AND FILM MADE OF THE SAME

(75) Inventors: Takeshi Ebara, Chiba (JP); Hideaki Hori, Sodegaura (JP)

(73) Assignee: Sumitomo Chemical Company, Limited, Osaka (JP)

(*) Notice: Subject to any disclaimer, the term of this patent is extended or adjusted under 35 U.S.C. 154(b) by 78 days.

(21) Appl. No.: 10/397,731

(22) Filed: Mar. 27, 2003

(65) Prior Publication Data

US 2003/0220453 A1 Nov. 27, 2003

(30) Foreign Application Priority Data

Mar. 29, 2002 (JP) .......... 2002-097930
Mar. 29, 2002 (JP) .......... 2002-097932

(51) Int. Cl.$^7$ .......... B32B 27/00; B32B 27/08; C08F 8/00; C08L 23/00; C08L 23/04
(52) U.S. Cl. .......... 525/191; 525/240; 428/500; 428/515
(58) Field of Search .......... 525/191, 240; 428/500, 515

(56) References Cited

U.S. PATENT DOCUMENTS 5,623,021 A * 4/1997 Pelliconi et al. .......... 525/240
5,948,547 A * 9/1999 Mikielski et al. .......... 428/516
6,573,332 B2 * 6/2003 Kume et al. .......... 525/191
2002/0049283 A1   4/2002 Kume et al.

FOREIGN PATENT DOCUMENTS

| JP | 55-59964 A | 5/1980 |
| JP | 61-84242 A | 4/1986 |
| JP | 61-108647 A | 5/1986 |
| JP | 62-119212 A | 5/1987 |
| JP | 8-245846 A | 9/1996 |
| JP | 8-283343 A | 10/1996 |
| JP | 2002-69143 A | 3/2002 |

* cited by examiner

*Primary Examiner*—Nathan M. Nutter
(74) *Attorney, Agent, or Firm*—Sughrue Mion, PLLC

(57) ABSTRACT

Disclosed is a resin composition that comprises a propylene-based copolymer (X) consisting of two kinds of copolymeric components made up of propylene, α-olefin and optionally ethylene which are characterized by ethylene content and α-olefin content, the copolymer (X) exhibiting a specific endothermic behavior in DSC measurement; a crystalline olefin-based polymer (Z) having a melting point up to 115° C.; and optionally a copolymer (Y) made up of propylene and α-olefin and/or ethylene. The resin composition can be modified by addition of a propylene-based polymer (W) and/or a nucleating agent (N) and can yield a film superior in low-temperature heat sealability and antiblocking property.

14 Claims, No Drawings

PROPYLENE-BASED RESIN COMPOSITION AND FILM MADE OF THE SAME

BACKGROUND OF THE INVENTION

1. Field of the Invention

The present invention relates to a propylene-based resin composition and to a film using the same.

The film of the present invention has optical characteristics, e.g. transparency and gloss, equal to those of conventional polypropylene films and is superior in low-temperature heat sealability and antiblocking property.

2. Description of the Related Art

Polypropylene has been used widely in fields of films and sheets due to its excellent transparency, heat resistance and food sanitation. In recent years, a fabrication speed of bags has been increased and a material with good low-temperature heat sealability is awaited in the field of packaging of foods and the like.

As a technique for achieving a good low-temperature heat sealability, Japan Patent No. 2882237 discloses that a polypropylene random copolymer which results from copolymerization of propylene and an α-olefin or of propylene, ethylene and an α-olefin performed in substantial absence of solvent by use of a Ziegler-Natta catalyst and which has specific ranges of propylene content, ethylene content, α-olefin content and 20° C. xylene-soluble fraction content and also has an increased comonomer content, and a film made of the copolymer are superior in low-temperature heat sealability. However, when the seal temperature is lowered by increasing the comonomer content, problems will arise; for example, if the comonomer content is increased to exceed a certain amount, rigidity will lower or the amount of fractions eluting in a solvent will increase, resulting in deterioration of food sanitation.

In JP, 60-166455,A and Japan Patent No. 3070419, disclosed is a polypropylene laminate film having a surface layer made of a polypropylene copolymer of a very high α-olefin content. However, laminate films obtained by such techniques have a drawback of being deteriorated in view of its heat sealability by corona treatment and are problematic in that a sufficient lowering of heat seal temperature can not be achieved because too much increase of comonomer content will cause stickiness during a film forming step. Therefore, further improvement has bee awaited.

SUMMARY OF THE INVENTION

The object of the present invention is to provide a polypropylene film having optical characteristics, e.g. transparency and gloss, equal to those of conventional polypropylene films and being superior in low-temperature heat sealability and antiblocking property.

In a first aspect of the present invention, provided is a propylene-based resin composition that comprises:

from 10 to 99% by weight of a propylene-based copolymer (X) consisting of from 1 to 30% by weight of component (A) that is a copolymeric component which is made up of propylene and an α-olefin having 4 or more carbon atoms and which satisfies Requirement 1 defined below or a copolymeric component which is made up of propylene, an α-olefin having 4 or more carbon atoms and ethylene and which satisfies Requirement 1 and Requirement 2 defined below and from 70 to 99% by weight of component (B) that is a copolymeric component which is made up of propylene and an α-olefin having 4 or more carbon atoms and which satisfies Requirement 3 defined below or a copolymeric component which is made up of propylene, an α-olefin having 4 or more carbon atoms and ethylene and which satisfies Requirement 3 and Requirement 4 defined below, wherein the copolymer (X) satisfies Requirement 5 defined below, from 0 to 60% by weight of a propylene-based copolymer (Y) made up of propylene and an α-olefin and/or ethylene, the copolymer (Y) having a content of propylene of from 86 to 97% by weight and a combined content of ethylene and α-olefin of from 3 to 14% by weight, and from 1 to 30% by weight of a crystalline olefin-based polymer (Z) having a melting point of 115° C. or lower, provided that each of the percentages of the amounts of the component (A) and the component (B) is based on the amount of the copolymer (X) and the sum of the percentages of the amounts of the components (A) and (B) is 100% by weight, each of the percentages of the amounts of the copolymer (X), the copolymer (Y) and the polymer (Z) is based on the combined amount of the compolymers (X), (Y) and polymer (Z), and the content of propylene in the copolymer (Y) and the combined content of ethylene and α-olefin in the copolymer (Y) are respectively based on the combined amount of propylene, ethylene and α-olefin in the copolymer (Y):

Requirement 1: The content of α-olefin having 4 or more carbon atoms in the component is not less than 1 mol % but less than 15 mol %.

Requirement 2: The content of ethylene in the component is not more than 5 mol %.

Requirement 3: The content of α-olefin having 4 or more carbon atoms in the component is from 15 mol % to 30 mol %.

Requirement 4: The content of ethylene in the component is not more than 5 mol %.

Requirement 5: In measurement of a DSC curve of the material, the amount of heat absorption within the temperature range of from T−10 (° C.) to T+10 (° C.) accounts for from 15 to 36% the amount of heat absorption within the temperature range of from 53° C. to 170° C., wherein T denotes a temperature (° C.) at which a maximum endothermic peak appears.

A film having a layer made of the propylene-based resin composition is also provided.

In a second aspect of the present invention, provided is a propylene-based resin composition that comprises:

from 10 to 98% by weight of a propylene-based copolymer (X) consisting of from 1 to 30% by weight of component (A) that is a copolymeric component which is made up of propylene and an α-olefin having 4 or more carbon atoms and which satisfies Requirement 1 defined above or a copolymeric component which is made up of propylene, an α-olefin having 4 or more carbon atoms and ethylene and which satisfies Requirement 1 and Requirement 2 defined above and from 70 to 99% by weight of component (B) that is a copolymeric component which is made up of propylene and an α-olefin having 4 or more carbon atoms and which satisfies Requirement 3 defined above or a copolymeric component which is made up of propylene, an α-olefin having 4 or more carbon atoms and ethylene and which satisfies Requirement 3 and Requirement 4 defined above, wherein the copolymer (X) satisfies Requirement 5 defined above, from 0 to 60% by weight of a propylene-based copolymer (Y) made up of propylene and an α-olefin and/or ethylene, the copolymer Y having a content of propylene of from 86 to 97% by weight and a combined content of ethylene and α-olefin of from 3 to 14% by weight, from 1 to 30% by weight of a crystalline olefin-based polymer (Z) having a melting point of 115° C. or lower, and from 1 to 30% by weight of a crystalline propylene-based polymer (W) having a melting point of 155° C. or higher and/or a nucleating agent (N) in an amount of from 0.1 to 3 parts by weight based on 100 parts by weight of the combined amount of the copolymers (X), (Y) and polymers (Z), (W), provided that each of the percentages of the amounts of the component (A) and the component (B) is based on the amount of the copolymer (X) and the sum of the percentages of the amounts of the components (A) and (B) is 100% by weight, each of the percentages of the amounts of the copolymers (X), (Y) and the polymers (Z), (W) is based on the combined amount of the copolymers (X), (Y) and the polymers (Z), (W), and the content of propylene in the copolymer (Y) and the combined content of ethylene and α-olefin in the copolymer (Y) are respectively based on the combined amount of propylene, ethylene and α-olefin in the copolymer (Y):.

A film having a layer made of the propylene-based resin composition is also provided.

DESCRIPTION OF PREFERRED EMBODIMENTS

<First Composition>

The propylene-based resin composition according to the first aspect of the present invention, which composition is referred to as "first composition", comprises:

a propylene-based copolymer (X) consisting of component (A) that is a copolymeric component which is made up of propylene and an α-olefin having 4 or more carbon atoms and which satisfies Requirement 1 mentioned later or a copolymeric component which is made up of propylene, an α-olefin having 4 or more carbon atoms and ethylene and which satisfies Requirement 1 and Requirement 2 mentioned later and component (B) that is a copolymeric component which is made up of propylene and an α-olefin having 4 or more carbon atoms and which satisfies Requirement 3 mentioned later or a copolymeric component which is made up of propylene, an α-olefin having 4 or more carbon atoms and ethylene and which satisfies Requirement 3 and Requirement 4 mentioned later, wherein the copolymer (X) satisfies Requirement 5 mentioned later, a propylene-based copolymer (Y), which is an optional component, made up of propylene and an α-olefin and/or ethylene, and a crystalline olefin-based polymer (Z) having a melting point of 115° C. or lower.

(i) Copolymer (X)

(i-A) Component (A)

Component (A) is a copolymeric component made up of propylene and an α-olefin having 4 or more carbon atoms or a copolymeric component made up of propylene, an α-olefin having 4 or more carbon atoms and ethylene, and preferably is a copolymeric component made up of propylene and an α-olefin having 4 or more carbon atoms.

The content of the α-olefin having 4 or more carbon atoms in component (A) is not less than 1 mol % but less than 15 mol % (Requirement 1), preferably 1 mol % or more and less than 12 mol %, and more preferably from 1 mol % to 10 mol %. When a copolymeric component having a content of α-olefin having 4 or more carbon atoms of less than 1 mol % is contained in place of component (A), the low-temperature heat sealability will become poor.

The content of ethylene in component (A) is up to 5 mol % (Requirement 2), and preferably up to 3 mol %. When the amount of ethylene contained in component (A) exceeds 5 mol %, a film made of the resin composition may get whitened or may come to have less rigidity with time.

(i-B) Component B

Component (B) is a copolymeric coponent made up of propylene and an α-olefin having 4 or more carbon atoms or a copolymeric component made up of propylene, an α-olefin having 4 or more carbon atoms and ethylene, aid preferably is a copolymeric component made up of propylene and an α-olefin having 4 or more carbon atoms.

The content of the α-olefin having 4 or more carbon atoms in component (B) is from 15 mol % to 30 mol % (Requirement 3), and preferably from 15 mol % to 25 mol %. When a copolymeric component having a content of α-olefin raving 4 or more carbon atoms of more than 30 mol % is contained in place of component (B), a film made of the resin composition may have a low rigidity.

The content of ethylene in component (B) is up to 5 mol % (Requirement 4), and preferably up to 3 mol %. When the amount of ethylene contained in component (B) exceeds 5 mol %, a film made of the resin composition may get whitened or may come to have less rigidity with time.

Examples of the α-olefin having 4 or more carbon atoms used in components (A) and (B) include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-docedene. Preferred are 1-butene, 1-pentene, 1-hexene and 1-octene. More preferred are 1-butene and 1-hexene in view of copolymerization property, economical efficiency, etc.

Examples of components (A) and (B) include propylene-1-butene copolymers, propylene-1-hexene copolymers, propylene-ethylene-1-butene copolymers and propylene-ethylene-1-hexene copolymers. Preferred are propylene-1-butene copolymers and propylene-1-hexene copolymers. The kinds of monomers constituting component (A) may be different from or the same as those of component (B). Component (A) and component (B) may be chemically bonded together or not bonded. Alternatively, a mixture comprising those chemically bonded and those not chemically bonded may also be available.

The copolymer (X) must satisfy the following requirement (Requirement 5).

Requirement 5: In measurement of a DSC curve of the material, the amount of heat absorption within the temperature range of from T−10 (° C.) to T+10 (° C.) accounts for from 15 to 36% the amount of heat absorption within the temperature range of from 53 to 170° C., wherein T denotes a temperature (° C.) at which a maximum endothermic peak appears.

A sample used in the measurement of a DSC curve is specifically a 0.5 mm thick sheet obtained by hot-press molding of a material for test (specifically, preheating the material at 230° C. for 5 minutes, followed by increasing pressure to 50 kgf/cm$^2$G over 3 minutes, followed by maintaining the pressure for 2 minutes, followed by cooling at 30° C. at 30 kgf/cm$^2$G for 5 minutes).

In the present invention, the measurement of a DSC curve is carried out under the following conditions. A DSC curve is obtained in such a manner that using a differential scanning calorimeter (manufactured by Perkin-Elmer, Inc., Model DSC-7), about 10 mg of a specimen sampled from the above-mentioned sheet is heated at 220° C. for 5 minutes under a nitrogen atmosphere, followed by cooling to 150° C. at a temperature decrease speed of 300° C./minute, followed by holding at 150° C. for one minute, followed by cooling to 50° C. at a temperature decrease speed of 5° C./minute, followed by holding at 50° C. for one minute, and followed by heating from 50° C. to 180° C. at a temperature increase speed of 5° C./minute.

Calculated is the area of a region surrounded by the DSC curve and a straight line (baseline) obtained by joining a point at 53° C. and a point at 170° C., which area is called a first area. On the other hand, calculated is the area of a region surrounded by the baseline and the DSC curve within the temperature range of from T−10 (° C.) to T+10 (° C.), wherein T denotes a temperature (° C.) at which a maximum endothermic peak appears, which area is called a second area. The ratio of the second area to the first area is defined as a ratio of the amount of main heat absorption to the amount of total heat absorption in the measurement of the DSC curve.

In the copolymer (X), the thus obtained ratio of the amount of main heat absorption to the amount of total heat absorption is from 15 to 36% (Requirement 5), preferably from 18 to 35%, more preferably from 20 to 34%, and still more preferably from 22 to 32%. If the ratio is too great, the distribution of the melting point of the copolymer (X) becomes narrow to cause stickiness of a film made of the composition in a temperature range for film formation, which may result in deterioration of operation efficiency or deterioration of corona treatment resistance of the film. On the other hand, if the ratio is too small, the crystallization rate at the time of film formation becomes small, which may deteriorate the operation efficiency of film formation.

The contents of components (A) and (B) in the copolymer (X) are from 1 to 30% by weight of component (A) and from 70 to 99% by weight of component (B), preferably from 5 to 30% by weight of component (A) and from 70 to 95% by weight of component (B), and more preferably from 5 to 20% by weight of component (A) and from 80 to 95% by weight of component (B), provided that each of the percentages of the amounts of component (A) and component (B) is based on the amount of the copolymer (X) and the sum of the amounts of components (A) and (B) is 100% by weight.

When the content of component (A) is less than 1% by weight (that is, the content of component (B) exceeds 99% by weight), serious sticking may occur during formation of a film from the composition. When the content of component (A) exceeds 30% by weight (that is, the content of component (B) less than 70% by weight), a film made of the composition may have an insufficient low-temperature heat sealability.

The copolymer (X) can be obtained, for example, by polymerizing component (A), which is a copolymer of propylene, an α-olefin having 4 or more carbon atoms and optionally ethylene, in a first step and subsequently polymerizing component (B), which also is a copolymer of propylene, an α-olefin having 4 or more carbon atoms and optionally ethylene, in a second step or in the second and later steps carried out in the presence of component (A) which has been formed in the first step.

The production of the copolymer (X) can be carried out using a known polymerization catalyst. Examples of the catalyst include Ziegler-Natta type catalysts and metallocene type catalysts. Preferred are catalysts containing Ti, Mg and halogen as essential components.

For example, Ti—Mg-based catalysts comprising a solid catalyst component obtained by compounding a magnesium compound with a titanium compound, and catalyst systems comprising such a solid catalyst component, an organoaluminum compound and a third component, e.g. an electron-donating compound, are mentioned. Specific examples are catalyst systems disclosed, for example, in JP, 61-218606,A, JP, 61-287904,A and JP, 7-216017,A.

The organoaluminum compound is not particularly restricted. Preferred are triethylaluminum, triisobutylaluminu, a mixture of triethylaluminum and diethylaluminum chloride, and tetraethyldialumoxane.

The electron-donating compound is not particularly restricted. Preferred are cyclohexylethyldimethoxysilane, tert-butyl-n-propyldimethoxysilane, tert-butylethyldimethoxysilane, and dicyclopentyldimethoxysilane.

As a polymerization method, available are, for example, solvent polymerization which uses an inert solvent typified by hydrocarbon compounds such as hexane, heptane, octane, decane, cyclohexane, methylcyclohexane, benzene, toluene and xylene, bulk polymerization which use a liquid monomer as a solvent, and gas phase polymerization which is carried out in a gaseous monomer. Preferred are bulk polymerization and gas phase polymerization where it is easy to perform post treatment. These polymerizations may be in a batch mode or in a continuous mode.

In the above polymerization methods, the polymerization used in the first step and the polymerization used in the second step or in the second and later steps may be the same or different. In view of polymerization activity and ease of post treatment, it is preferred that the first step be a step in which polymerization is carried out in the absence of an inert solvent and the second step or the second and later steps be a step or steps in which polymerization is carried out in a gas phase. The polymerization in the first step and the polymerization in the second step or in the second and later steps may be carried out in the same polymerization vessel (reactor) or different polymerization vessels (reactors).

The production method may be, for example, solvent-solvent polymerization, bulk-bulk polymerization, gas phase-gas phase polymerization, solvent-gas phase polymerization, bulk-gas phase-gas phase polymerization, solvent-gas phase-gas phase polymerization, and bulk-gas phase-gas phase polymerization. Preferred are bulk-gas phase polymerization, gas phase-gas phase polymerization and bulk-gas phase-gas phase polymerization.

The polymerization temperature used in the first step is not particularly limited, but usually is from 20 to 150° C., and in view of productivity and controllability of the contents of components (A) and (B), preferably from 35 to 95° C.

The polymerization temperature used in the second step or in the second and later steps may be equal to or different from that used in the first step. It is usually from 20 to 150° C., and preferably from 35 to 95° C.

In the above-mentioned production methods, post treatments, e.g. inactivation of a catalyst, removal of a solvent, removal of monomers, drying and granulation may optionally be carried out.

Examples of the copolymer (X) include (propylene-1-butene)-(propylene-1-butene) copolymers, (propylene-1-butene)-(propylene-ethylene-1-butene) copolymers, (propylene-ethylene-1-butene)-((propylene-1-butene) copolymers, (propylene-ethylene-1-butene)-(propylene-ethylene-1-butene) copolymers, and (propylene-1-hexene)-(propylene-1-hexene) copolymers. Preferred are (propylene- 1-butene)-(propylene-1-butene) copolymers and (propylene-1-hexene)-(propylene-1-hexene) copolymers. More preferable are (propylene-1-butene)-(propylene-1-butene) copolymers. With regard to two pairs of parentheses in each copolymer listed above, the former pair and the latter pair indicate component (A) and component (B), respectively.

The melt flow rate (MFR) of the copolymer (X) measured at 230° C. is not particularly restricted, but, in view of flowability or film formability, is preferably from 0.1 to 50 g/10 min, more preferably from 1 to 20 g/10 min. To control flowability, the MFR may be changed by an appropriate method, e.g. addition of organic peroxide, during melt kneading.

(ii) Copolymer (Y)

In the present invention, the copolymer (Y), which is added as needed, is a copolymer made up of propylene and an α-olefin having 4 or more carbon atoms and/or ethylene. The content of propylene in the copolymer (Y) is from 86 to 97% by weight, preferably from 88 to 97% by weight, and more preferably from 88 to 96.5% by weight. When the copolymer (Y) is a copolymer made up of propylene and an α-olefin having 4 or more carbon atoms, the proportion of the α-olefin is a value obtained by subtracting the above-mentioned propylene content from 100% by weight. When the copolymer (Y) is a copolymer made up of propylene and ethylene, the proportion of ethylene is a value obtained by subtracting the above-mentioned propylene content from 100% by weight. When the copolymer (Y) is a copolymer made up of propylene, an α-olefin having 4 or more carbon atoms and ethylene, the combined proportion of the α-olefin and ethylene is a value obtained by subtracting the above-mentioned propylene content from 100% by weight. The weight ratio of the α-olefin to the ethylene is preferably from 30/70 to 90/10.

The copolymer (Y) is preferably a random copolymer made up of propylene and an α-olefin having 4 or more carbon atoms and/or ethylene, and specifically, a crystalline ethylene-propylene random copolymer, an ethylene-butene-1-propylene random terpolymer or the like conomomer contents of which are within the above-mentioned ranges. In view of heat seal temperature of a film obtained from the resin composition of the present invention, the melting point of the copolymer (Y) is preferably lower than 155° C., and more preferably not higher than 150° C.

In view of the antiblocking property of a film obtained from the resin composition of the present invention, the content of a 20° C. xylene-soluble fraction of the copolymer (Y) is preferably up to 15% by weight, more preferably up to 13% by weight, and still more preferably up to 10% by weight.

The MFR of the copolymer (Y) is preferably from 0.1 to 50 g/10 min, more preferably from 1 to 20 g/10 min, and still more preferably from 1 to 15 g/10 min.

(iii) Crystalline Olefin-Based Polymer (Z)

The crystalline olefin-based polymer (Z) is a homopolymer or copolymer having a melting point of 115° C. or lower. When a crystalline olefin-based polymer having a melting point of higher than 115° C. in place of the polymer (Z), the low-temperature heat sealability will be insufficient in many cases.

The polymer (Z) is preferably a crystalline polymer containing butene-1. Specific examples thereof include homopolymers of butene-1 and copolymers of butene-1 and an α-olefin, other than butene-1, having from 2 to 10 carbon atoms, e.g. copolymers of butene-1 with propylene or ethylene.

The MFR of the polymer (Z) is preferably from 0.1 to 50 g/10 min, more preferably from 1 to 20 g/10 min, and still more preferably from 1 to 18 g/10 min.

The content of a 20° C. xylene-soluble fraction in the polymer (Z) is 20% by weight or more, preferably 25% by weight or more, and more preferably 30% by weight or more.

The propylene-based resin composition of the present invention comprises a copolymer (X), a polymer (Z) and a copolymer (Y), which is optionally added. Proportions of the ingredients compounded are copolymer (X) of from 10 to 99% by weight: copolymer (Y) of from 0 to 60% by weight: polymer (Z) of from 1 to 30% by weight, preferably copolymer (X) of from 20 to 99% by weight: copolymer (Y) of from 0 to 60% by weight: polymer (Z) of from 1 to 30% by weight, and more preferably copolymer (X) of from 30 to 99% by weight: copolymer (Y) of from 0 to 50% by weight: polymer (Z) of from 1 to 20% by weight. In addition, another desirable combination is characterized by proportions of copolymer (Y) of from 0 to 55% by weight: polymer (Z) of from 5 to 25% by weight, the remaining being the copolymer (X) Here, the sum of the proportions of the copolymer (X), (Y) and polymer (Z) is 100% by weight.

If the proportion of the copolymer (X) is less than 10% by weight, a film obtained from the resin composition will have an insufficient low-temperature heat sealability, whereas when exceeding 99% by weight, a film obtained from the resin composition will have a poor antiblocking property.

If the proportion of the polymer Z is less than 1% by weight, a film obtained from the resin composition will have an insufficient low-temperature heat sealability, whereas when exceeding 30% by weight, the processing stability and the antiblocking property will be damaged.

There is no necessity to add copolymer (Y). However, when its proportion exceeds 60% by weight, a film obtained from the resin composition will have an insufficient low-temperature heat sealability.

In the polypropylene resin composition of the present invention, the amount of the fraction eluting in xylene (20° C.) is up to 50% by weight, preferably up to 40% by weight, and more preferably up to 35% by weight.

The polypropylene resin composition has an MFR of from 0.1 to 50 g/10 min, preferably from 1 to 20 g/10 min, and more preferably from 2 to 15 g/10 min.

The propylene resin composition of the present invention can be obtained by dispersing uniformly the copolymer (X), polymer (Z) and optionally copolymer (Y), which have been prepared separately, by an appropriate method. For example, extrusion melt blending, Banbury blending and the like can be applied.

The propylene-resin composition can also be obtained by so-called multiple stage polymerization in which polymerization conditions are changed stepwise.

The propylene-based resin composition of the present invention may optionally contain additives and resins other than the aforementioned copolymers and polymers. Examples of the additives include antioxidants, ultraviolet absorbers, antistatic agents, lubricants, nucleating agents, pressure sensitive adhesives, anti-clouding agents and anti-blocking agents. Examples of the additional resins include olefin-based resins other than the copolymers (X), (Y) and polymer (Z), e.g. ethylene-based resins.

<Second Composition>

The propylene-based resin composition according to the second aspect of the present invention, which composition is referred to as "second composition", comprises:

a propylene-based copolymer (X) consisting of component (A) that is a copolymeric component which is made up of propylene and an α-olefin having 4 or more carbon atoms and which satisfies Requirement 1 mentioned previously or a copolymeric component which is made up of propylene, an α-olefin having 4 or more carbon atoms and ethylene and which satisfies Requirement 1 and Requirement 2 mentioned previously and component (B) that is a copolymeric component which is made up of propylene and an α-olefin having 4 or more carbon atoms and which satisfies Requirement 3 mentioned previously or a copolymeric component which is made up of propylene, an α-olefin having 4 or more carbon atoms and ethylene and which satisfies Requirement 3 and Requirement 4 mentioned previously, wherein the copolymer (X) satisfies Requirement 5 mentioned previously, a propylene-based copolymer (Y), which is an optional component, made up of propylene and an α-olefin and/or ethylene, and a crystalline olefin-based polymer (Z) having a melting point of 115° C. or lower, and a specific propylene-based polymer (W) and/or a nucleating agent (N).

The copolymers (X), (Y) and polymer (Z) contained in the second composition are ingredients the same as those contained in the first composition described previously. Therefore, unless otherwise stated, the descriptions about these ingredients in the first composition are applied also to the second composition.

(iv) Propylene-Based Polymer (W)

The propylene-based polymer (W) used in the present invention is a polymer which has a melting point of 155° C. or higher, preferably 157° C. or higher. Since the second composition of the present invention contains such a polymer (W), the composition is excellent in heat resistance and, therefore, is excellent in processing stability.

The polymer (W) may be a homopolymer of propylene or a copolymer of propylene and less than 3% by weight of monomer. Preferred are random copolymers of propylene and other monomers.

The MFR of the polymer (W) is preferably from 0.1 to 200 g/10 min, more preferably from 1 to 150 g/10 min.

The content of a 20° C. xylene-soluble fraction in the polymer (W) is preferably not more than 10% by weight, preferably not more than 7% by weight, and more preferably not more than 5% by weight. When the content of a 20° C. xylene-soluble fraction is larger than the above ranges, the amount of a fraction eluting in a solvent adversely becomes large.

(v) Nucleating Agent (N)

Examples of the nucleating agent (N) include nucleating agents and resins having a nucleating activity conventionally employed.

The nucleating agents are exemplified by those of phosphate type, e.g. bis (4-tert-butylphenyl) sodium phosphate and 2,2-methylenebis(4,6-di-tert-butyiphenyl)sodium phosphate; those of sorbitol type, e.g. bis(p-methylbenzylidene) sorbitol, bis(p-ethylbenzylidene)sorbitol and 1,3,2,4-dibenzylidenesorbitols disclosed in JP, 59-164348,A and JP, 63-132937,A (the benzylidene group may have a substituent, e.g. methyl, ethyl, methoxy and chloro, at its 4-position or dimethyl at its 2- and 4-positions).

The resins having a nucleating activity are exemplified by branched α-olefin polymers, alicyclic polymers and high density polyethylene.

The amounts of the ingredients in the second composition are mentioned below.

The content of the copolymer (X) in the polypropylene resin composition is from 10 to 98% by weight, preferably from 20 to 98% by weight, and more preferably from 30 to 98% by weight.

The content of the copolymer (Y) in the polypropylene resin composition is from 0 to 60% by weight and preferably from 0 to 50% by weight.

The content of the polymer (Z) in the polypropylene resin composition is from 1 to 30% by weight, preferably from 1 to 25% by weight, and more preferably from 1 to 20% by weight.

The content of the polymer (W) in the polypropylene resin composition is from 1 to 30% by weight, preferably from 1 to 20% by weight, and more preferably from 1 to 15% by weight.

Here, the sum of the amounts of the copolymers (X), (Y) and polymers (Z), (W) is 100% by weight.

The amount of the nucleating agent (N) per 100 parts by weight of the total of the ingredients (X), (Y), (Z) and (W) is from 0.1 to 3 parts by weight, preferably from 0.1 to 2 parts by weight. Since the second composition of the present invention contains such a nucleating agent (N) in such an amount, the composition is excellent in heat resistance and, therefore, is excellent in processing stability.

If the content of the copolymer (X) is less than 10% by weight, the low-temperature heat sealability will become insufficient, whereas when exceeding 99% by weight, the processing stability will become poor.

If the content of the polymer (Z) is less than 1% by weight, the low-temperature heat sealability will become poor, whereas when exceeding 30% by weight, heat resistance during processing and the antiblocking property will become poor.

If the content of the polymer (W) is less than 1% by weight, the processing stability will become insufficient, whereas when exceeding 30% by weight, the low-temperature heat sealability will become poor.

There is no need for addition of the copolymer (Y). However, when its content exceeds 60% by weight, the low-temperature heat sealability will become poor.

When the content of the nucleating agent (N) is less than 0.1 parts by weight, the stability during processing is insufficient, whereas when exceeding 3 parts by weight, physical properties of films, e.g. transparency, will become poor.

In the polypropylene resin composition of the present invention, the amount of the fraction eluting in xylene (20° C.) is preferably up to 50% by weight, more preferably up to 40% by weight, and still more preferably up to 35% by weight.

The polypropylene resin composition preferably has an MFR of from 0.1 to 50 g/10 min, more preferably from 1 to 20 g/10 min, and still more preferably from 2 to 15 g/10 min.

The propylene resin composition of the present invention can be obtained by dispersing uniformly the copolymer (X), the polymers(Z), the polymer (W) and/or the nucleating agent (N) and, optionally, the copolymer (Y), which have been prepared separately, by an appropriate method. For example, extrusion melt blending, Banbury blending and the like can be applied.

It can also be obtained by so-called multiple stage polymerization in which polymerization conditions are changed stepwise. When the composition is prepared using such multiple stage polymerization, the nucleating agent (N) may be added at any timing unless the agent loses its activity.

The propylene-based resin composition of the present invention may optionally contain additives and resins other than the aforementioned copolymers and polymers. Examples of the additives include antioxidants, ultraviolet absorbers, antistatic agents, lubricants, nucleating agents, pressure sensitive adhesives, anti-clouding agents and anti-blocking agents. Examples of the additional resins include olefin-based resins other than the copolymers (X), (Y) and polymers (Z), (W), e.g. ethylene-based resins.

The film of the present invention is a film having a layer made of a propylene-based resin composition of the present invention such as those described above.

Examples of the film of the present invention include films consisting of a single layer made of a propylene-based polymer composition of the present invention and films comprising at least two layers including a layer made of a propylene-based resin composition of the present invention.

The method for producing the film of the present invention is not particularly restricted and may be chosen depending upon the layer constitution of the film. For example, available for the purpose are blow film formation, T-die film formation and calendering.

Depending upon the layer constitution of a film to be produced, methods in which a film is formed only from a propylene-based resin composition of the present invention by the above-mentioned techniques and methods in which multiple layers (at least two layers) of a resin composition of the present invention and other resin material(s) are formed together into a film are applicable. The method for forming a film comprising multiple layers is exemplified by conventionally used coextrusion, extrusion lamination, hot lamination and dry lamination.

In addition, a method in which a film or sheet which has been prepared in advance is stretched to form a film is also available. Examples of methods for the stretching include unially or biaxially stretching achieved by roll stretching, tenter stretching, tubular stretching or the like. In view of a balance of physical properties, e.g. low-temperature heat sealability, transparency and rigidity, of a resulting film, preferred are non-stretching coextrusion and biaxially stretching.

An example of applications of the film of the present invention is packaging. Examples of films for packaging include films for packaging foodstuffs and films for packaging clothes. Preferred are films for packaging foodstuffs.

EXAMPLES

The present invention will be illustrated specifically below with reference to examples and comparative examples. However, the invention is not restricted to these examples. The methods for preparing the samples used in the examples and comparative examples and the methods for measuring physical properties are described below.

(1) Contents (Unit: % by Weight) of Components (A) and (B)

The contents of components (A) and (B) in a propylene-based copolymer (X) are determined from a material balance of polymerization.

(2) 1-Butene Content (Unit: % by Weight)

The content of 1-butene in a substance was determined from a characteristic absorption of the substance at a wavenumber of 770 $cm^{-1}$ by a method for measuring IR spectrum described in Macromolecule Handbook (1995, published by Kinokuniya), page 619 or from a characteristic absorption in $^{13}C$-NMR.

(3) Ethylene Content (Unit: % by Weight)

The content of ethylene in a substance was determined from characteristic absorptions of the substance within the wavenumber range of from 732 to 720 $cm^{-1}$ by a conventional method with an infrared spectrophotometer using a standard sample.

(4) Melting Point (T, Unit: ° C.)

In a fusion curve obtained by hot-press forming a material for test (that is, preliminarily heating the material at 230° C. for 5 minutes, followed by increasing the pressure to 50 $kgf/cm^2$ over 3 minutes and holding the pressure for 2 minutes, followed by cooling at 30° C. at 30 $kgf/cm^2$ for 5 minutes) to obtain a sheet 0.5 mm in thickness. Then, a 10 mg piece cut out from the sheet was heat treated in a nitrogen atmosphere at 220° C. for 5 minutes, followed by cooling to 150° C. at a temperature dropping rate of 300° C./min, followed by holding at 150° C. for 1 minute, followed by further cooling to 50° C. at a temperature dropping rate of 5° C./min, followed by holding at 50° C. for 1 minute, followed by heating from 50° C. to 180° C. at a temperature raising rate of 5° C./min, a temperature T (° C.) at which a maximum endothermic peak appeared was measured.

(5) Melt Flow Rate (MFR, Unit: g/10 min)

MFR was measured according to JIS K7210 at a temperature of 230° C. and at an applied load of 21.18 N.

(6) Transparency (Haze, Unit: %)

Transparency was measured according to JIS K7105.

(7) Gloss (Gloss, Unit: %)

Gloss was measured according to JIS K7105.

(8) Heat Seal Temperature (HST, Unit: ° C.)

A portion of a surface of a film and another of the same surface of the film were allowed to face in contact together and were heat sealed by pressing for 2 seconds under a load of 2 $kg/cm^2G$ using a heat sealer (manufactured by Toyo Seiki Seisaku-Sho, Ltd.) heated to predetermined temperatures (eleven points at 5° C. intervals between 65° C. and 115° C.). The resulting sample was conditioned overnight at 23° C. and at a humidity of 50%. Subsequently, the sample was measured for a seal temperature at which a peel resistance of 300 g/25 mm was detected when peeling was carried out under the following conditions: a temperature of 23° C., a humidity of 50%, a peel speed of 200 mm/min and a peel angle of 180 degrees. The seal temperature obtained was considered as a heat seal temperature.

(9) Blocking (Unit: $kg/12$ $cm^2$)

A specimen obtained by bringing one surface of a film and the other surface of the film in contact together and processing at 60° C. for 3 hours under an applied load of 500 $g/12$ $cm^2$ was shear peeled. A maximum load (kg) was determined and indicated in $kg/12$ $cm^2$.

(10) Processing Stability

The processing stability was evaluated by directly touching a film coming out from an oven after biaxially stretching. When the film has no sticky feeling, it is assigned as ◯. When the film has some sticky feeling, it is assigned as Δ. When the film is extremely sticky, it is assigned as x.

(11) Maximum Endothermic Peak Temperature (T, Unit: ° C.) and Ratio of Amount of Main Heat Absorption to Amount of Total Heat Absorption (Unit: %)

(11-1) Maximum Endothermic Peak Temperature (T, Unit: ° C.)

Measured was the temperature T (° C.) at which a maximum endothermic peak appears in a melting curve that was obtained by preparing a 0.5 mm thick sheet by hot-press forming a material for test (namely, preheating the material at 230° C. for 5 minutes, increasing the pressure up to 50 $kgf/cm^2G$ over 3 minutes and holing the pressure for 2 minutes, and then cooling the composition at 30° C. for 5 minutes), heat treating a 10 mg piece cut out from the resulting sheet at 220° C. for 5 minutes under a nitrogen atmosphere using a differential scanning calorimeter (Model DSC-7, manufactured by Perkin Elmer Co.), subsequently cooling to 150° C. at a temperature decrease speed of 300°

C./minute, holding at 150° C. for one minute, further cooling to 50° C. at a temperature decrease speed of 5° C./minute, holding at 50° C. for one minute, and heating from 50° C. to 180° C. at a temperature increase speed of 5° C./minute.

(11-2) Ratio of Amount of Main Heat Absorption to Amount of Total Heat Absorption (Unit: %)

In the resulting melting curve were determined the area surrounded by the melting curve and a straight line (baseline) obtained by joining a point at 53° C. and a point at 170° C., namely the amount of total heat absorption, and the area surrounded by the baseline and the melting curve within the temperature range of from T−10 (° C.) to T+10 (° C.), centered at a temperature T (° C.) where a maximum endothermic peak appears, namely the amount of main heat absorption, from which the ratio was calculated according to the following formula.

Ratio of amount of main heat absorption to amount of total heat absorption=(Amount of main heat absorption/Amount of total heat absorption)×100

<First Series>

Example 1

[Synthesis of Solid Catalyst]

The atmosphere in a stainless reactor with a capacity of 200 L equipped with a stirrer was replaced with nitrogen and then 80 L of hexane, 6.55 mol of tetrabutoxytitanium, 2.8 mol of diisobutyl phthalate and 98.9 mol of tetrabutoxysilane were charged therein to form a homogeneous solution. Then, 51 L of a solution of butylmagnesium chloride of a concentration of 2.1 mol/L in diisobutyl ether was added dropwise slowly over 5 hours while the temperature in the reactor was kept at 5° C. After completion of the dropping, stirring was continued for another 1 hour. Solid-liquid separation was conducted at room temperature and washing with 70 L of toluene was repeated three times.

Subsequently, toluene was removed so that the slurry content became 0.6 kg/L. Thereafter, a mixed solution of 8.9 mol of di-n-butyl ether and 274 mol of titanium tetrachloride was added and then 20.8 mol of phthalyl chloride was also added, followed by a three-hour reaction at 110° C. After the reaction, washing with toluene was repeated twice at 95° C.

After adjustment of the slurry concentration to 0.6 kg/L, 3.13 mol of diisobutyl phthalate, 8.9 mol of di-n-butyl ether and 137 mol of titanium tetrachloride were added and a reaction was carried out at 105° C. for 1 hour. After the completion of the reaction, solid-liquid separation was carried out at that temperature and washing with 90-L toluene was repeated twice at 95° C.

After adjustment of the slurry concentration to 0.6 kg/L, 8.9 mol of di-n-butyl ether and 137 mol of titanium tetrachloride were added and a reaction was carried out at 95° C. for 1 hour. After the completion of the reaction, solid-liquid separation was carried out at that temperature and washing with 90-L toluene was repeated three times at the same temperature.

After adjustment of the slurry concentration to 0.6 kg/L, 8.9 mol of di-n-butyl ether and 137 mol of titanium tetrachloride were added and a reaction was carried out at 95° C. for 1 hour.

After the completion of the reaction, solid-liquid separation was carried out at that temperature and washing was repeated three times at the same temperature using 90-L toluene, followed by additional washing with 90-L of hexane three times. Subsequent drying under reduced pressure afforded 11.0 kg of solid catalyst component.

The solid catalyst component contained 1.89% by weight of titanium atom, 20% by weight of magnesium atom, 8.6% by weight of phthalic acid ester, 0.05% by weight of ethoxy group and 0.21% by weight of butoxy group, and had favorable particle properties free from fine powder.

[Preliminary Activation of Solid Catalyst]

To a SUS autoclave with a capacity of 3 L equipped with a stirrer, 1.5 L of n-hexane which had been fully dewatered and degassed, 37.5 mmol of triethylaluminum, 3.75 mmol of tert-butyl-n-propyldimethoxysilane and 15 g of the above-described solid catalyst component were added. Subsequent to preliminary activation by continuously feeding 15 g of propylene over 30 minutes while keeping the temperature in the reactor between 5° C. and 15° C., the resulting solid catalyst slurry was transferred to a SUS autoclave with a capacity of 200 L equipped with a stirrer, diluted by addition of 140 L of liquid butane, and preserved at a temperature of 5° C. or lower.

[Polymerization of Propylene-Based Copolymer (X)]

(First Step)

In a SUS polymerization vessel with a capacity of 300 L equipped with a stirrer, there were fed 35 kg/hr of liquid propylene, 13 kg/hr of 1-butene and hydrogen in an amount such that the hydrogen concentration of the gas phase portion was kept at 0.5 vol %. Further, 0.6 g/hr of the preliminarily activated solid catalyst component was fed and slurry polymerization using liquid propylene as a medium was continued at a polymerization temperature of 60° C. under conditions such that the substantial amount of slurry staying in the vessel was kept at 90 L. The amount of the polymer formed during this operation was 2.0 kg/hr. From the analysis of part of the polymer, the butene content was 7.7 mol %. The resulting slurry containing the polymer was transferred continuously without being inactivated to a polymerization vessel for a second step.

(Second Step)

In a gas-phase fluidized bed reactor with a capacity of 1 m³ equipped with a stirrer, 22.2 kg/hr of a propylene-based polymer (X-1) was obtained by feeding the solid catalyst component-containing polymer transferred from the reactor for the first step, 50 mmol/hr of triethylaluminum and 5 mmol/hr of tert-butyl-n-propyldimethoxysilane and continuing the continuous polymerization under conditions such that propylene, hydrogen and 1-butene were fed so as to hold the amount of polymer contained in the fluidized bed to 80 kg, the polymerization temperature to 65° C., the polymerization pressure to 1.15 MPa, the hydrogen concentration in the gas phase to 2.5 vol % and the 1-butene content in the gas phase to 25 vol %. The 1-butene content in the propylene-based polymer (X-1) was 20.0 mol %. The weight ratio of the polymer obtained in the first step (component (A)) to the polymer obtained in the second step (component (B)) was determined from the amounts of the polymers in individual steps to be 10/90. The 1-butene content in component (B) was 21.8 mol %.

That is, in the propylene-based copolymer (X-1) obtained, the content of component (A) was 10% by weight, the content of component (B) was 90% by weight, the 1-butene content of component (A) was 7.7 mol %, the 1-butene content of component (B) was 21.8 mol %, and the 1-butene content in the propylene-based copolymer (X-1) was 20.0 mol %. In measurement of a DSC curve of the copolymer (X-1), the ratio of the amount of main heat absorption to the amount of total heat absorption was 29%.

[Pelletization of Composition]

To 100 parts by weight of a powder obtained by mixing 90% by weight of the propylene-based copolymer (X-1) and 10% by weight of TAFMER BL3450 (manufactured by Mitsui Chemicals, Inc., melting point 85.8° C.) (Z-1), which is polybutene-1, 0.1 parts by weight of calcium stearate, 0.05 parts by weight of Irganox 1010 (manufactured by Ciba Specialty Chemicals), 0.1 parts by weight of 2,6-di-tert-butyl-4-methylphenol (BHT manufactured by Sumitomo Chemical Co., Ltd.) and 0.4 parts by weight of Tospearl 120 (manufactured by GE Toshiba Silicones) were mixed and then melt kneaded, resulting in pellets. The pellets obtained had an MFR of 8.2 g/10 min.

[Preparation of Stretched Film]

The pellets obtained above and FS2011DG2 (polypropylene having a melting point of 159° C. and an MFR of 2.5 g/10 min) were used for a surface layer and a substrate layer, respectively. These were melt-kneaded separately in different extruders at resin temperatures of 230° C. for the surface layer and 260° C. for the substrate layer, respectively, and then were fed to one coextruding T-die. A resin extruded in two-kind two-layer constitution of surface layer/substrate layer from the T-die was cooled rapidly with a 30° C. cooling roll, thereby affording a cast sheet 1 mm thick.

The cast sheet obtained in the above manner was preliminarily heated and then stretched 5 times in the longitudinal direction at a stretching temperature of 125° C. using a difference in peripheral speed between rolls of the longitudinal stretching machine. Subsequently, the sheet was stretched 8 times in the transverse direction at a stretching temperature of 157° C. in an oven, followed by heat treatment at 165° C. Thereby obtained was a two-layer biaxially stretched film having a surface layer 1.5 Hm thick and a substrate layer 20 μm thick, which was then wound up with a winder. The results of evaluation of physical properties of the resulting film are shown in Table 1.

Example 2

Pelletization, film formation and evaluation of physical properties were carried out in the same manner as Example 1 except using blending proportions of 90% by weight of the propylene-based polymer (X-1) and 10% by weight of TAFMER XR110T (manufactured by Mitsui Chemicals, Inc., melting point 109.1° C.) (Z-2), which is a propylene/1-butene copolymer. The pellets obtained had an MFR of 7.5 g/10 min. The results are shown in Table 1.

Example 3

Pelletization (MFR=8.1 g/10 min), film formation and evaluation of physical properties were carried out in the same manner as Example 1 except using blending proportions of 80% by weight of the propylene-based polymer (X-1) and 20% by weight of the propylene/1-butene copolymer (Z-2). The results are shown in Table 1.

Example 4

Pelletization, film formation and evaluation of physical properties were carried out in the same manner as Example 1 except using blending proportions of 70% by weight of the propylene-based polymer (X-1) and 30% by weight of the propylene/1-butene copolymer (Z-2). The pellets obtained had an MFR of 8.1 g/10 min. The results are shown in Table 1.

Example 5

Pelletization, film formation and evaluation of physical properties were carried out in the same manner as Example 1 except using blending proportions of 65% by weight of the propylene-based polymer (X-1), 25% by weight of Sumitomo Noblen RW150XG (manufactured by Sumitomo Chemical Co., Ltd., ethylene content 4.6% by weight), which is a propylene/ethylene random copolymer, and 10% by weight of the polybutene-1 (Z-1). The pellets obtained had an MFR of 8.1 g/10 min. The results are shown in Table 1.

Comparative Example 1

A propylene/1-butene copolymer (X-2) was obtained by a single step gas phase polymerization using a titanium chloride type solid catalyst system in the same manner as Example 1 described in JP, 2-57770,B. The 1-butene content in the resulting copolymer was 19.2 mol %. In measurement of a DSC curve of the copolymer X-1, the ratio of the amount of main heat absorption to the amount of total heat absorption was 37%.

Pelletization, film formation and evaluation of physical properties were carried out in the same manner as Example 1 using the copolymer (X-2) alone. The pellets obtained had an MFR of 8.3 g/10 min. The results are shown in Table 1. The heat seal temperature was high.

Comparative Example 2

Pelletization, film formation and evaluation of physical properties were carried out in the same manner as Example 1 except using blending proportions of 90% by weight of the propylene-based polymer (X-2) and 10% by weight of the propylene/1-butene copolymer (Z-2). The pellets obtained had an MFR of 8.5 g/10 min. The results are shown in Table 1. The heat seal temperature was high.

Comparative Example 3

Pelletization, film formation and evaluation of physical properties were carried out in the same manner as Example 1 using the copolymer (X-1) alone. The pellets obtained had an MFR of 8.2 g/10 min. The results are shown in Tables 1 and 2. The heat seal temperature was high.

Comparative Example 4

Pelletization, film formation and evaluation of physical properties were carried out in the same manner as Example 1 except using blending proportions of 90% by weight of the propylene-based polymer (X-1) and 10% by weight of a propylene/ethylene/1-butene copolymer having a melting point of 117.6° C. (ethylene content 1.0% by weight, 1-butene content 20.3% by weight) (Z-3). The pellets obtained had an MFR of 8.1 g/10 min. The results are shown in Table 1. The heat seal temperature was high.

TABLE 1

| | Resin Composition | | | |
|---|---|---|---|---|
| | X (wt %) | Y (wt %) | Z (wt %) | MFR (g/10 min) |
| Example 1 | X-1 (90) | — | Z-1 (10) | 9.5 |
| Example 2 | X-1 (90) | — | Z-2 (10) | 7.5 |
| Example 3 | X-1 (80) | — | Z-2 (20) | 8.1 |
| Example 4 | X-1 (70) | — | Z-2 (30) | 8.1 |
| Example 5 | X-1 (65) | Y-1 (25) | Z-1 (10) | 8.1 |
| Comparative Example 1 | X-2 (100) | — | — | 8.3 |
| Comparative Example 2 | X-2 (90) | — | Z-2 (10) | 8.5 |
| Comparative Example 3 | X-1 (100) | — | — | 8.2 |

TABLE 1-continued

| | | | | |
|---|---|---|---|---|
| Comparative Example 4 | X-1 (90) | — | Z-3(10) | 8.1 |

| | Property of Film | | | |
|---|---|---|---|---|
| | Haze (%) | Gloss (%) | HST (° C.) | Blocking (kg/12 cm²) |
| Example 1 | 2.6. | 152 | 82 | 0.64 |
| Example 2 | 2.4 | 152 | 95 | 0.49 |
| Example 3 | 2.5 | 150 | 94 | 0.49 |
| Example 4 | 2.5 | 150 | 93 | 0.59 |
| Example 5 | 2.5 | 150 | 83 | 0.53 |
| Comparative Example 1 | 2.5 | 150 | 99 | 0.72 |
| Comparative Example 2 | 2.7 | 150 | 98 | 0.67 |
| Comparative Example 3 | 2.3 | 151 | 96 | 0.58 |
| Comparative Example 4 | 2.5 | 150 | 96 | 0.43 |

<Second Series>

Example 6

[Pelletization of Composition]

After mixing of 87% by weight of the propylene-based copolymer (X-1), 10% by weight of TAFMER BL3450 (manufactured by Mitsui Chemicals, Inc., melting point 85.8° C.) (Z-1), which is a polybutene-1, 3% by weight of Sumitomo Noblen HU100G (manufactured by Sumitomo Chemical Co., Ltd., melting point 165° C.) (W-1), which is a propylene polymer, 0.1 parts by weight, based on 100 parts by weight of the powder of the foregoing composition, of calcium stearate, 0.05 parts by weight of Irganox 1010 (manufactured by Ciba Specialty Chemicals), 0.1 parts by weight of 2,6-di-tert-butyl-4-methylphenol (BHT manufactured by Sumitomo Chemical Co., Ltd.) and 0.4 parts by weight of Tospearl 120 (manufactured by GE Toshiba Silicones), melt kneaded was conducted to yield pellets. The pellets obtained had an MFR of 9.5 g/10 min.

[Preparation of Stretched Film]

A two-layer biaxially stretched film having a surface layer 1.5 μm thick and a substrate layer 20 μm thick was produced in the same manner as Example 1 except using the pellets obtained above for a surface layer. The results of evaluation of physical properties of the resulting film are shown in Table 2.

Example 7

Pelletization, film formation and evaluation of physical properties were carried out in the same manner as Example 6 except using blending proportions of 75% by weight of the propylene-based polymer (X-1), 15% by weight of TAFMER BL3450 (Z-1), which is a polybutene-1, and 10% by weight of the propylene-based polymer (W-1). The pellets obtained had an MFR of 9.0 g/10 min. The results are shown in Table 2.

Example 8

Pelletization, film formation and evaluation of physical properties were carried out in the same manner as Example 6 except using blending proportions of 70% by weight of the propylene-based polymer (X-1), 10% by weight of TAFMER XR110T (manufactured by Mitsui Chemicals, Inc., melting point 109.1° C.) (Z-2), which is a propylene/1-butene copolymer, and 20% by weight of the propylene-based polymer (W-1). The pellets obtained had an MFR of 9.8 g/10 min. The results are shown in Table 2.

Example 9

Pelletization, film formation and evaluation of physical properties were carried out in the same manner as Example 6 except using blending proportions of 87% by weight of the propylene-based polymer (X-1), 10% by weight of TAFMER BL3450 (Z-1), which is a polybutene-1, 3% by weight of the propylene-based polymer (W-1), and 0.5 parts by weight (indicated as phr in Table 2), based on 100 parts by weight of the combined weight of the former three resins, of a high density polyethylene (MFR=16.5, density=0.956) (N-1). The pellets obtained had an MFR of 9.2 g/10 min. The results are shown in Table 2.

Example 10

Pelletization, film formation and evaluation of physical properties were carried out in the same manner as Example 6 except using blending proportions of 80% by weight of the propylene-based polymer (X-1), 10% by weight of TAFMER BL3450 (Z-1), which is a polybutene-1, 10% by weight of the propylene-based polymer (W-1), and 0.5 parts by weight, based on 100 parts by weight of the combined weight of the former three resins, of the high density polyethylene (N-1). The pellets obtained had an MFR of 9.6 g/10 min. The results are shown in Table 2.

Example 11

Pelletization, film formation and evaluation of physical properties were carried out in the same manner as Example 6 except using blending proportions of 52% by weight of the propylene-based polymer (X-1), 28% by weight of Sumitomo Noblen RW150XG (manufactured by Sumitomo Chemical Co., Ltd., ethylene content 4.6% by weight) (Y-1), which is a propylene/ethylene random copolymer, 15% by weight of TAFMER BL3450 (Z-1) as a polybutene-1, and 5% by weight of the propylene-based polymer (W-1). The pellets obtained had an MFR of 8.2 g/10 min. The results are shown in Table 2.

Example 12

Pelletization, film formation and evaluation of physical properties were carried out in the same manner as Example 6 except using blending proportions of 49% by weight of the propylene-based polymer (X-1), 26% by weight of the propylene/ethylene random copolymer (Y-1), 15% by weight of TAFMER BL3450 (Z-1), which is a polybutene-1, and 10% by weight of the propylene-based polymer (W-1). The pellets obtained had an MFR of 9.2 g/10 min. The results are shown in Table 2.

Example 13

Pelletization, film formation and evaluation of physical properties were carried out in the same manner as Example 6 except using blending proportions of 55% by weight of the propylene-based polymer (X-1), 30% by weight of the propylene/ethylene random copolymer (Y-1), 15% by weight of TAFMER BL3450 (Z-1), which is a polybutene-1, and 0.5 parts by weight, based on 100 parts by weight of the combined weight of the former three resins, of the high density polyethylene (N-1). The pellets obtained had an MFR of 7.9 g/10 min. The results are shown in Table 2.

Comparative Example 5

Pelletization, film formation and evaluation of physical properties were carried out in the same manner as Example 6 except using blending proportions of 65% by weight of the propylene-based polymer (X-1) and 35% by weight of the propylene/ethylene random copolymer (Y-1). The pellets obtained had an MFR of 8.0 g/10 min. The results are shown in Table 2. The heat seal temperature was high.

Comparative Example 6

Pelletization, film formation and evaluation of physical properties were carried out in the same manner as Example 6 except using blending proportions of 90% by weight of the propylene-based polymer (X-1) and 10% by weight of TAFMER BL3450 (Z-1), which is a polybutene-1. The pellets obtained had an MFR of 8.2 g/10 min. The results are shown in Table 2. The processing stability was poor.

Comparative Example 7

Pelletization, film formation and evaluation of physical properties were carried out in the same manner as Example 6 except using blending proportions of 65% by weight of the propylene-based polymer (X-1), 25% by weight of the propylene/ethylene random copolymer (Y-1) and 10% by weight of TAFMER BL3450 (Z-1), which is a polybutene-1. The pellets obtained had an MFR of 9.1 g/10 min. The results are shown in Table 2. The processing stability was poor.

Comparative Example 8

Pelletization, film formation and evaluation of physical properties were carried out in the same manner as Example 6 except using blending proportions of 65% by weight of the propylene-based polymer (X-1), 25% by weight of the propylene-based polymer (W-1). The pellets obtained had an MFR of 8.2 g/10 min. The results are shown in Table 2. The heat seal temperature was high.

TABLE 2

| | Resin Composition | | | | |
| --- | --- | --- | --- | --- | --- |
| | X (wt %) | Y (wt %) | Z (wt %) | W (wt %) | N (wt %) | MFR (g/10 min) |
| Example 6 | x-1 (87) | — | Z-1 (10) | W-1 (3) | — | 9.5 |
| Example 7 | x-1 (75) | — | Z-1 (15) | W-1 (10) | — | 9.0 |
| Example 8 | x-1 (70) | — | Z-2 (10) | W-1 (20) | — | 9.8 |
| Example 9 | x-1 (87) | — | Z-1 (10) | W-1 (3) | N-1 (0.5) | 9.2 |
| Example 10 | x-1 (80) | — | Z-1 (10) | W-1 (10) | N-1 (0.5) | 9.6 |
| Example 11 | x-1 (52) | Y-1 (28) | Z-1 (15) | W-1 (5) | — | 8.2 |
| Example 12 | x-1 (49) | Y-1 (26) | Z-1 (15) | W-1 (10) | — | 9.2 |
| Example 13 | x-1 (55) | Y-1 (30) | Z-1 (15) | — | N-1 (0.5) | 7.9 |
| Comparative Example 3 | x-1 (100) | — | — | — | — | 8.2 |
| Comparative Example 5 | x-1 (65) | Y-1 (35) | — | — | — | 8.0 |
| Comparative Example 6 | x-1 (90) | — | Z-1 (10) | — | — | 8.2 |
| Comparative Example 7 | x-1 (65) | Y-1 (25) | Z-1 (10) | — | — | 9.1 |
| Comparative Example 8 | x-1 (65) | Y-1 (25) | — | W-1 (10) | — | 8.2 |

TABLE 2-continued

| | Resin Composition Property of Film | | | |
| --- | --- | --- | --- | --- |
| | Haze (%) | HST (° C.) | Blocking (kg/12 cm$^2$) | Processing Stability |
| Example 6 | 2.7 | 83 | 0.55 | ○ |
| Example 7 | 2.3 | 81 | 0.42 | ○ |
| Example 8 | 2.5 | 90 | 0.31 | ○ |
| Example 9 | 2.8 | 85 | 0.46 | ○ |
| Example 10 | 2.8 | 85 | 0.52 | ○ |
| Example 11 | 2.4 | 87 | 0.44 | ○ |
| Example 12 | 2.4 | 82 | 0.57 | ○ |
| Example 13 | 2.4 | 87 | 0.43 | Δ |
| Comparative Example 3 | 2.3 | 96 | 0.58 | X |
| Comparative Example 5 | 2.7 | 95 | 0.31 | Δ |
| Comparative Example 6 | 2.2 | 80 | 0.79 | X |
| Comparative Example 7 | 2.5 | 83 | 0.53 | X |
| Comparative Example 8 | 2.5 | 95 | 0.34 | ○ |

According to the present invention, a polypropylene film can be obtained which has optical characteristics, e.g. transparency and gloss, equal to those of prior art and which is superior in low-temperature heat sealability and antiblocking property.

What is claimed is:

1. A propylene-based resin composition comprising:

from 10 to 99% by weight of a propylene-based copolymer (X) consisting of from 1 to 30% by weight of component (A) that is a copolymeric component which is made up of propylene and an α-olefin having 4 or more carbon atoms and which satisfies Requirement 1 defined below or a copolymeric component which is made up of propylene, an α-olefin having 4 or more carbon atoms and ethylene and which satisfies Requirement 1 and Requirement 2 defined below and from 70 to 99% by weight of component (B) that is a copolymeric component which is made up of propylene and an α-olefin having 4 or more carbon atoms and which satisfies Requirement 3 defined below or a copolymeric component which is made up of propylene, an α-olefin having 4 or more carbon atoms and ethylene and which satisfies Requirement 3 and Requirement 4 defined below, wherein the copolymer (X) satisfies Requirement 5 defined below, from 0 to 60% by weight of a propylene-based copolymer (Y) made up of propylene and an α-olefin and/or ethylene, the copolymer (Y) having a content of propylene of from 86 to 97% by weight and a combined content of ethylene and α-olefin of from 3 to 14% by weight, and from 1 to 30% by weight of a crystalline olefin-based polymer (Z) having a melting point of 115° C. or lower, provided that each of the percentages of the amounts of the component (A) and the component (B) is based on the amount of the copolymer (X) and the sum of the percentages of the amounts of the components (A) and (B) is 100% by weight, each of the percentages of the amounts of the copolymer (X), the copolymer (Y) and the polymer (Z) is based on the combined amount of the compolymers (X), (Y) and polymer (Z), and the content of propylene in the copolymer (Y) and the combined content of ethylene and α-olefin in the copolymer (Y)

are respectively based on the combined amount of propylene, ethylene and α-olefin in the copolymer (Y):

Requirement 1: The content of α-olefin having 4 or more carbon atoms in the component is not less than 1 mol % but less than 15 mol %.

Requirement 2: The content of ethylene in the component is not more than 5 mol %.

Requirement 3: The content of α-olefin having 4 or more carbon atoms in the component is from 15 mol % to 30 mol %.

Requirement 4: The content of ethylene in the component is not more than 5 mol %.

Requirement 5: In measurement of a DSC curve of the material, the amount of heat absorption within the temperature range of from T−10 (° C.) to T+10 (° C.) accounts for from 15 to 36% the amount of heat absorption within the temperature range of from 53° C. to 170° C., wherein T denotes a temperature (° C.) at which a maximum endothermic peak appears.

2. The propylene-based resin composition according to claim 1, wherein the copolymer (X) is a copolymer such that the component (A) is polymerized in a first step and the component (B) is polymerized in a second step or in the second and later steps performed in the presence of the component (A) which has been formed in the first step.

3. The propylene-based resin composition according to claim 2, wherein the copolymer (X) is a copolymer obtained by performing the polymerization for forming the component (A) in the absence of an inert solvent and performing the polymerization for forming the component (B) in a gas phase.

4. The propylene-based resin composition according to claims 1, wherein the copolymer (X) is a copolymer obtained by polymerizing propylene and an α-olefin having 4 or more carbon atoms or polymerizing propylene, an α-olefin having 4 or more carbon atoms and ethylene in the presence of a solid catalyst component containing Ti, Mg and halogen as essential components.

5. The propylene-based resin composition according to claim 1 which comprises from 20 to 99% by weight of the propylene-based copolymer (X), from 0 to 60% by weight of the copolymer (Y) and from 1 to 30% by weight of the polymer (Z), provided that the sum of the amounts of the copolymers (X), (Y) and polymer (Z) is 100% by weight.

6. The propylene-based resin composition according to claim 1, wherein the polymer (Z) is a copolymer containing 1-butene.

7. A film having a layer made of the propylene-based resin composition according to claim 1.

8. A propylene-based resin composition that comprises:
from 10 to 98% by weight of a propylene-based copolymer (X) consisting of from 1 to 30% by weight of component (A) that is a copolymeric component which is made up of propylene and an α-olefin having 4 or more carbon atoms and which satisfies Requirement 1 defined below or a copolymeric component which is made up of propylene, an α-olefin having 4 or more carbon atoms and ethylene and which satisfies Requirement 1 and Requirement 2 defined below and from 70 to 99% by weight of component (B) that is a copolymeric component which is made up of propylene and an α-olefin having 4 or more carbon atoms and which satisfies Requirement 3 defined below or a copolymeric component which is made up of propylene, an α-olefin having 4 or more carbon atoms and ethylene and which satisfies Requirement 3 and Requirement 4 defined below, wherein the copolymer (X) satisfies Requirement 5 defined below, from 0 to 60% by weight of a propylene-based copolymer (Y) made up of propylene and an α-olefin and/or ethylene, the copolymer Y having a content of propylene of from 86 to 97% by weight and a combined content of ethylene and α-olefin of from 3 to 14% by weight, from 1 to 30% by weight of a crystalline olefin-based polymer (Z) having a melting point of 115° C. or lower, and from 1 to 30% by weight of a crystalline propylene-based polymer (W) having a melting point of 155° C. or higher and/or a nucleating agent (N) in an amount of from 0.1 to 3 parts by weight based on 100 parts by weight of the combined amount of the copolymers (X), (Y) and polymers (Z), (W), provided that each of the percentages of the amounts of the component (A) and the component (B) is based on the amount of the copolymer (X) and the sum of the percentages of the amounts of the components (A) and (B) is 100% by weight, each of the percentages of the amounts of the copolymers (X), (Y) and the polymers (Z), (W) is based on the combined amount of the copolymers (X), (Y) and the polymers (Z), (W), and the content of propylene in the copolymer (Y) and the combined content of ethylene and α-olefin in the copolymer (Y) are respectively based on the combined amount of propylene, ethylene and α-olefin in the copolymer (Y):

Requirement 1: The content of α-olefin having 4 or more carbon atoms in the component is not less than 1 mol % but less than 15 mol %.

Requirement 2: The content of ethylene in the component is not more than 5 mol %.

Requirement 3: The content of α-olefin having 4 or more carbon atoms in the component is from 15 mol % to 30 mol %.

Requirement 4: The content of ethylene in the component is not more than 5 mol %.

Requirement 5: In measurement of a DSC curve of the material, the amount of heat absorption within the temperature range of from T−10 (° C.) to T+10 (° C.) accounts for from 15 to 36% the amount of heat absorption within the temperature range of from 53° C. to 170° C., wherein T denotes a temperature (° C.) at which a maximum endothermic peak appears.

9. The propylene-based resin composition according to claim 8, wherein the copolymer (X) is a copolymer such that the component (A) is polymerized in a first step and the component (B) is polymerized in a second step or in the second and later steps performed in the presence of the component (A) which has been formed in the first step.

10. The propylene-based resin composition according to claim 9, wherein the copolymer (X) is a copolymer obtained by performing the polymerization for forming the component (A) in the absence of an inert solvent and performing the polymerization for forming the component (B) in a gas phase.

11. The propylene-based resin composition according to claims 8, wherein the copolymer (X) is a copolymer obtained by polymerizing propylene and an α-olefin having 4 or more carbon atoms or polymerizing propylene, an α-olefin having 4 or more carbon atoms and ethylene in the presence of a solid catalyst component containing Ti, Mg and halogen as essential components.

12. The propylene-based resin composition according to claim 8 which comprises from 20 to 98% by weight of the copolymer (X),
from 0 to 60% by weight of the copolymer (Y),
from 1 to 25% by weight of the polymer (Z), and
from 1 to 20% by weight of the polymer (W), the sum of the copolymers (X), (Y) and polymers (Z), (W) being 100% by weight, and/or the nucleating agent (N) in an amount of from 0.1 to 3 parts by weight based on 100 parts by weight of the combined amount of the copolymers (X), (Y) and polymers (Z), (W).

13. The propylene-based resin composition according to claim 8, wherein the polymer (Z) is a copolymer containing 1-butene.

14. A film having a layer made of the propylene-based resin composition according to claim 8.

* * * * *